United States Patent Office 3,372,203
Patented Mar. 5, 1968

3,372,203
REMOVAL OF IMPURITIES FROM ALCOHOLS BY EXTRACTION WITH SUGAR
Jerry W. Wimberley, Ponca City, Okla., assignor to Continental Oil Company, Ponca City, Okla., a corporation of Delaware
No Drawing. Filed Oct. 1, 1964, Ser. No. 400,877
10 Claims. (Cl. 260—643)

ABSTRACT OF THE DISCLOSURE

The odor level of alkyl sulfates prepared by sulfating aliphatic alcohols contaminated with odor precursors is improved by contacting said alcohols with sugar prior to sulfating.

---

This invention relates to the purification of alcohols derived from alkyl aluminum, particularly the invention relates to the removal of odor precursors from such alcohols.

Alcohols are now made from alkyl aluminum compounds by oxygen oxidation of these to the corresponding alkoxides, which alkoxides are hydrolyzed to the corresponding alcohols.

Side reactions produce diols, esters, ethers, acids aldehydes, hydrocarbons, etc. which are present in the alcohol as produced—in impurity amounts.

Alkyl sulfates made from these alcohols have a disagreeable odor. It has been determined that an impurity or impurities in the alcohol react during sulfation to produce this odor. These materials are called odor precursors.

Normally these alcohols are produced from alkyl aluminum which has been prepared as an ethylene growth reaction product. As a result the alcohol product includes a wide range of carbon atom numbers, e.g., 2–30 carbon atoms. The reaction is controlled so that most of the alcohols fall in the range of 6–22, desirably 6–18, carbon atoms.

A main object of the invention is a process for removing sulfate odor precursors from alcohols derived by hydrolysis of the oxygen oxidation product of alkyl aluminum.

Other objects of the invention will become apparent in the course of the detailed description thereof.

The process of the invention wherein sulfate odor precursors are removed from alcohols derived by hydrolysis of the oxygen oxidation product of alkyl-aluminum, comprises extraction of these alcohols using either liquid or solid, which may be pentose, hexose or the dimers thereof, and separating an alcohol phase of decreased odor precursor content from a sugar phase. The sugar solvent may include water.

The invention is directed to aliphatic alcohols (1-alkanols) derived from alkylaluminum compounds through aluminum alkoxides and hydrolysis thereof to the corresponding alkanols. The production of alcohols by this route is now conventional. For illustrative procedures see U.S. Patents Nos. 3,017,438, 3,053,905, 3,070,616, 3,087,954, 3,093,691, 3,097,226, and 3,104,251. Also Chemical Engineering Progress, 58, 85–88 (May 1962).

Commonly these are even carbon number, straight chain, saturated primary monohydric alcohols, having at least 6 carbon atoms. While these alcohols are readily available up to about 30 carbon atom number, those used for sulfate production are below about 22, and desirably 18, carbon atom number. Although products are available which include essentially only one carbon atom number alcohol, e.g., 1-hexanol, 1-octanol, 1-tetradecanol, it is customary to use mixtures of two or more alcohols. A common mixture includes alcohols having 6, 8 and 10 carbon atoms; another mixture includes 12 and 14 carbon atom alcohols; another mixture includes 12, 14 and 16 carbon atom alcohols; another mixture includes 16 and 18 carbon atom alcohols. In the case of these mixtures, usually some small amount of lower and higher carbon atom number alcohols are present; thus the 6–10 alcohol may include some 4 and/or 12 carbon atom number alcohol; the 12–14 alcohol may include some 10 and/or 16 carbon atom alcohol; the 16–18 alcohol may include some 14 and/or 20 and 22 carbon atom alcohols.

The alcohol charged to the process may be truly "raw" in the sense that no treatment at all has been given the alcohol to remove (or convert) the impurities present therein. Or the alcohol may be raw in the sense that treatment, such as hydrogenation, has not decreased the odor precursor content, or other impurities, to the desired degree.

The extractant used in the process of the invention is a sugar, either a monosaccharide or disaccharide; in other words, a pentose, a hexose, or a dimer of pentose or hexose. Illustrative surgars are aldopentose, glucose, fructose, mannose, dextrose (D-glucose) sucrose, lactose, maltose and cellobiose.

The sugars may be used in the anhydrous molten state, or they may include water such as to form a syrup, or they may be used in the solid state.

The extraction is carried out at a temperature such that the alcohol is liquid, or where both alcohol and sugar are liquid. It is to be understood that the temperature will be held below the decomposition temperature of the sugar. Obviously, the extraction temperature will vary with the particular sugar and/or alcohol feed. It may be necessary in some cases to operate at superatmospheric pressure.

The odor precursors pass into the extractant to form an extract phase—some alcohol is also extracted—which may be liquid or solid. The alcohol phase contains less sulfate odor precursors than were present in the alcohol feed. Owing to the insolubility of the sugar solvent in the alcohol it is possible generally to remove sugar from the alcohol phase by cooling the alcohol phase. When aqueous sugar solvent is used, water may be removed from the alcohol product by distillation.

It is to be understood that the well known principles applicable to liquid-liquid extraction operations and liquid-solid extraction operations are also applicable here and, therefore, it is not necessary to go into the details of relative amounts of extractant and alcohol feed, contacting procedures, separation procedures, etc.

EXAMPLES 1–3

The process of the invention is illustrated by the treatment of a 1216 alcohol containing 12, 14 and 16 carbon atom 1-alkanols, some 10 and 18 carbon atom alkanols were also present. This alcohol was a product of hydrolysis of the air oxidation of a broad range alkyl-aluminum ethylene growth reaction product. The 1216 alcohol had been obtained by distillation of the broad range alcohol product. The distilled 1216 alcohol was the feed to the process without further treatment before the liquid-liquid extraction operation.

The effectiveness of the liquid-liquid extraction operation was measured by means of the odor of the alcohol sulfate produced from the alcohol product.

The alcohol sulfate odor rating system is based on the following:

*Type of odor*

T _____ Typical alcohol sulfate type odor.
U _____ Untypical alcohol sulfate type odor.
0 _____ No odor.

*Intensity of odor*

| | |
|---|---|
| 1, 2 | Faint. |
| 3, 4 | Moderate. |
| 5 | Strong. |

The odor rating received on each alcohol sulfate sample is the average value of ratings by five members on the odor panel. The rating consists of two numbers: (1) an initial rating based on evaluation immediately after removal of the cap from the sample, and (2) an aired odor rating evaluated after the sample, had aired for ten minutes.

The odor rating was given to alcohols which had been converted to the alkyl sulfate by treatment with chlorsulfonic acid using a standard procedure.

In all of the examples the alcohol was subjected to a two stage extraction operation. In the first stage the 1216 alcohol and the sugar solvent were heated until the system was liquid. The two immiscible liquids were agitated for 30 minutes at the selected temperature. It was found to be beneficial to cool somewhat the liquid system before separating the alcohol phase from the solvent extract phase.

The alcohol phase was then mixed with another quantity of fresh solvent; the system was brought to the liquid state and then agitated for 30 minutes. The liquid system was then cooled somewhat and the two phases separated.

The alcohol phase was then freed of sugar solvent by cooling to a temperature at which the sugar was solid. In Example 1 the product alcohol was freed of any water present by treatment with calcium hydride. In Examples 2 and 3 the product alcohol was water washed to remove sugar solvent; the washed alcohol was freed of water by distillation.

The dry alcohol was then sulfated and the odor determined.

Dry alcohol feed was sulfated to provide a reference odor rating. The initial odor was T-3.0 and the aired odor rating was T-2.0.

EXAMPLE 1

In this example 200 grams of alcohol feed and 500 grams of glucose were contacted in the first extraction stage at 302° F. The first alcohol phase was contacted with 502 grams of glucose in a second extraction stage at 291° F. The yield of alcohol product was 75%. The odor rating of the sulfate was initial U-1.2 and aired U-0.7.

EXAMPLE 2

In the first extraction stage 200 grams of alcohol were contacted with 1000 grams of dextrose at 275° F. In the second extraction phase the first alcohol phase was contacted with 979 grams of dextrose at 257° F. A 96% yield of alcohol product was obtained. The sulfate odor rating was initial T-1.8 and aired T-1.0.

EXAMPLE 3

In this example the sugar solvent consisted of 75 weight percent of sucrose and 25% water. In the first extraction stage 200 grams of alcohol were contacted with 1000 grams of sugar solvent at 194° F. In the second extraction stage the first alcohol phase was contacted with 980 grams of sugar solvent at 194° F. The yield of alcohol product was 90%. The sulfate odor rating was initial T-1.2 and aired percent-0.8.

EXAMPLE 4

100 ml. of raw 12 carbon atom 1-alkanol was percolated through solid sucrose (finely granulated table grade). The bed of sucrose was positioned in a 1 inch I.D. glass tube and was 54 inches in height. The treated alcohol was percolated through a small amount of charcoal to remove any sugar that had been occluded with the alcohol. The product alcohol was then sulfated. The odor level of the alcohol sulfate was very much improved over the odor of raw alcohol sulfate.

The above working examples clearly establish that the process of the invention effects a substantial improvement in the odor of the sodium alcohol sulfate, i.e., a substantial decrease in the odor precursors content of the alcohol.

Thus having described the invention, what is claimed is:

1. A process for the removal of sulfate odor precursors from alcohols derived by hydrolysis of the oxygen oxidation product of alkylaluminum which process comprises:

extraction of said alcohol having at least 6 carbon atoms with a solid, molten or syrupy sugar selected from the class consisting of pentoses, hexoses and dimers thereof at a temperature wherein said alcohol is liquid and below the decomposition temperature of said sugar; and separating an alcohol phase of decreased odor precursor content from a sugar phase.

2. The process of claim 1 wherein said sugar is glucose.
3. The process of claim 1 wherein said sugar is sucrose.
4. The process of claim 1 wherein said sugar is dextrose.
5. The process of claim 1 wherein said alcohol has 6-18 carbon atoms.
6. The process of claim 1 wherein said extraction is liquid-liquid extraction.
7. The process of claim 6 wherein said sugar solvent includes water.
8. The process of claim 1 wherein said extraction is liquid-solid extraction with said sugar forming the solid phase.
9. A process for the removal of sulfate odor precursors from alcohol derived by hydrolysis of the oxygen oxidation product of alkylaluminum which process comprises:

liquid-liquid first extraction of a mixture of said alcohols having about 12-16 carbon atoms with sucrose-water solvent having about 75% sucrose and about 25% water, in weight proportion of about 5 parts of solvent per 1 part of said alcohol mixture at a temperature of about 194° F.;

separating an alcohol phase from a solvent extract phase;

extracting said alcohol phase with sucrose-water solvent having about 75% sucrose and about 25% water, under the conditions of said first extraction; and separating a second alcohol phase of decreased odor precursor content from a second solvent extract phase.

10. A process for the removal of sulfate odor precursors from alcohol derived by hydrolysis of the oxygen oxidation product of alkylaluminum which process comprises:

a liquid-liquid first extraction of a mixture of said alcohol having about 12-16 carbon atoms with dextrose solvent in weight proportion of about 5 parts of solvent per 1 part of said alcohol mixture at a temperature of about 257-275° F.;

separating an alcohol phase from a solvent extract phase;

extracting said alcohol phase with dextrose solvent under the conditions of said first extraction; and separating a second alcohol phase of decreased odor precursor content from a second solvent extract phase.

References Cited

UNITED STATES PATENTS

| | | | |
|---|---|---|---|
| 1,593,304 | 7/1926 | Johns | 260—643 |
| 1,751,211 | 3/1930 | Leonori | 260—643 |

LEON ZITVER, *Primary Examiner.*

J. E. EVANS, *Assistant Examiner.*